United States Patent [19]
Yokozawa et al.

[11] Patent Number: 5,420,739
[45] Date of Patent: May 30, 1995

[54] PORTABLE AUDIO DEVICE WITH A DETACHABLE CONTROL UNIT

[75] Inventors: Hiroshi Yokozawa; Takeshi Matsuda; Harumi Kanou, all of Tokyo, Japan

[73] Assignee: SMK Corporation, Tokyo, Japan

[21] Appl. No.: 168,069

[22] Filed: Dec. 15, 1993

[30] Foreign Application Priority Data

Dec. 16, 1992 [JP] Japan .............................. 4-091466 U

[51] Int. Cl.6 .............................................. G11B 15/00
[52] U.S. Cl. .......................................... 360/137; 369/1
[58] Field of Search ............... 360/137, 22; 242/129.1, 242/129.2, 129.3; 369/1; 381/187, 188, 183

[56] References Cited

U.S. PATENT DOCUMENTS

4,206,409 6/1980 McKinney .......................... 455/345
4,855,844 8/1989 Snodgrass ............................. 360/22

*Primary Examiner*—Andrew L. Sniezek
*Attorney, Agent, or Firm*—Mark Catan; Thomas R. Morrison

[57] ABSTRACT

A portable audio unit has a main unit, such as a CD player or tape recorder. The main unit is connected to a control unit by a cable. Audio and control signals are transmitted by the cable. The control unit has a connector for an earphone. Audio signals are transmitted by the cable from the main unit, to the control unit and to a connected earphone. Control signals are transmitted from the control unit to the main unit for controlling functions such as volume, power, tape-play, etc. The main unit has a built-in winder that stores and retrieves the cable. The control unit may be attached to the main unit when the cord is wound up and stored. With the control unit attached and the cable stored in side the main unit, the portable audio unit may still be operated by the control unit which forms a built-in control panel. With the cable extended, the control unit may be used as a remote control permitting the main unit to be placed in a handbag or pocket. In a portable audio unit having a separate remote control, a control panel is included in the main unit. The present invention avoids the need for the control panel because the control unit doubles as a control panel. Cost, size and complexity of the portable audio unit are thereby reduced.

23 Claims, 4 Drawing Sheets

PORTABLE AUDIO DEVICE WITH A DETACHABLE CONTROL UNIT

BACKGROUND OF THE INVENTION

The present invention relates to portable audio devices, and more particularly, to portable audio devices with control units that are detachable from a main unit.

Figure 7:
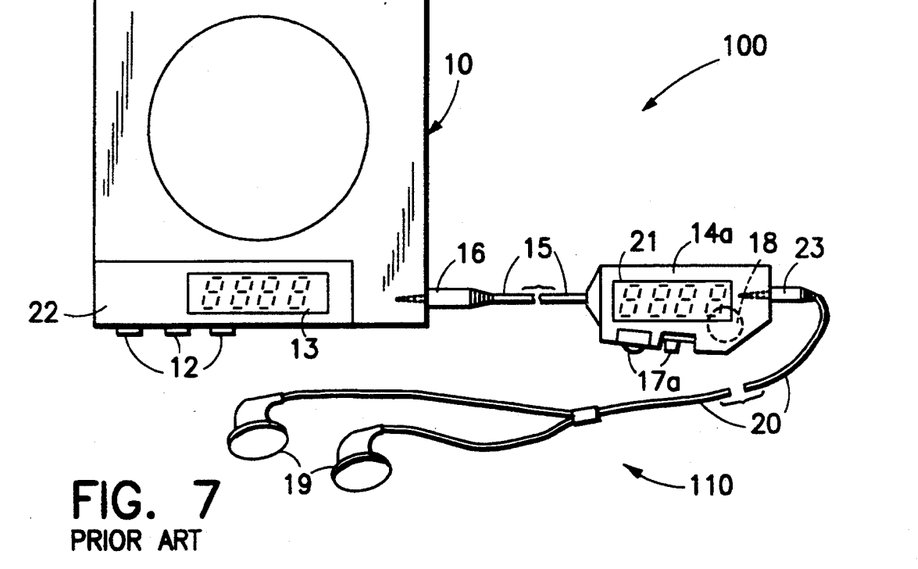
FIG. 7 is a front view of a portable audio device according to the prior art.
Figure 8:
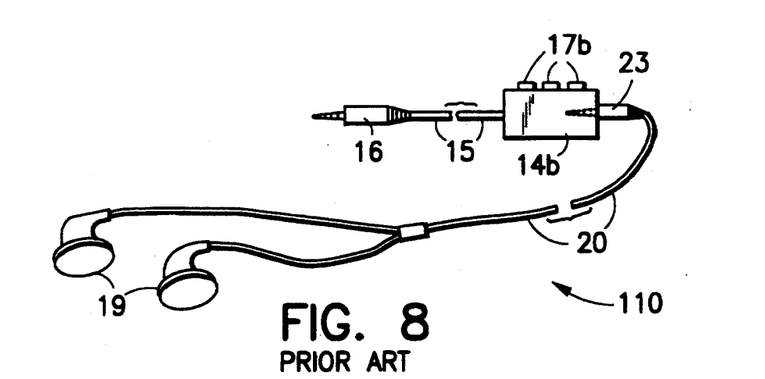
FIG. 8 is a view of an earphone set and remote control unit of a portable audio device according to the prior art.
Figure 9:
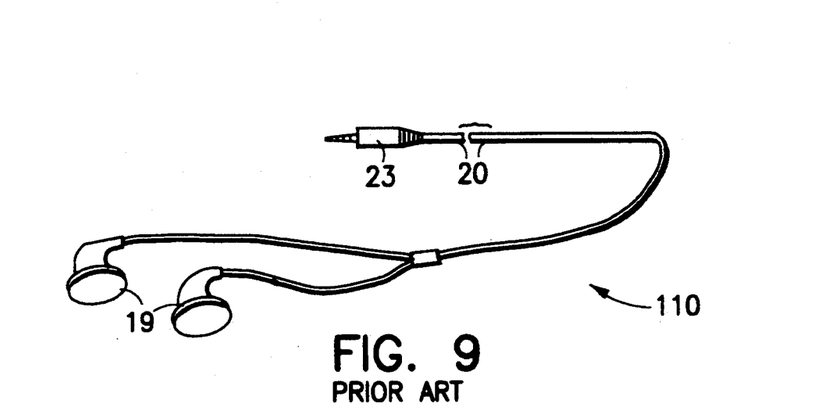
FIG. 9 is a view of an earphone set according to the prior art.

Referring to FIGS. 7, 8 and 9, a typical prior art portable audio device 100 such as a compact disk (CD) player or tape recorder, has a main unit 10 with a main control panel 22. Main control panel 22 includes a main display 13 and main control actuators 12. Main control actuators 12 in, for example, a tape recorder, allow a user to control functions such as sound volume, tape stop, tape rewind and tape fast forward, etc.

An audio/control cable 15 transmits audio signals from main unit 10 and control signals from a remote control unit 14a. Remote control unit 14a has a remote display 21 and remote control actuators 17a. Remote control actuators 17a and remote display 21 perform at least some of the same functions as main control actuators 12 and main display 13 respectively. An audio cable 20 transmits audio signals from a first plug 23 to an earphone set 110. A second plug 16, insertable in main unit 10, allows audio/control cable 15 to be connected and disconnected from main unit 10. First plug 23, insertable in remote control units 14a and 14b, allows audio cable 20 to be connected and disconnected from remote control units 14a and 14b. A battery 18, in remote control unit 14a, powers devices such as a clock (not shown), to show time on remote display 21.

Referring to FIG. 9, main unit 10 may be used without remote control units 14a or 14b. In this case, first plug 23 is connected directly to main unit 10. Audio cable 20 transmits audio signals directly from main unit 10 to a pair of earphones 19. Main unit 10 is controlled by main control actuators 12.

Referring now to FIG. 8, one kind of remote control unit 14b, has no built-in display. However, there is no remote counterpart to main display 13. This permits remote control unit 14b to be smaller and less expensive than remote control unit 14a.

Referring, now, also to FIG. 7, like remote control unit 14a, remote control unit 14b has remote control actuators 17b which perform the same functions as main control actuators 12. Either of main control actuators 12 or remote control actuators 17b may be used to control main unit 10. Earphone set 110 is connectable to remote control unit 14b by first plug 23 as it is to remote control unit 14a.

When main unit 10 is used with earphone set 110 alone, main control panel 22 is necessary for control. But when remote control unit 14b is used with main unit 10, main control actuators 12 become redundant. This is because remote control actuators 17b perform the same functions as main control actuators 12. The redundancy is even greater when remote control unit 14a is used with main unit 10. In this case, main display 13 also becomes redundant. Such redundancies in control and display functions increase the cost, size and probability of breakdown of portable audio device 100.

OBJECTS AND SUMMARY OF THE INVENTION

It is an object of the pre, sent invention to provide a portable audio device having a remote control, that is lower in cost and size than those of the prior art.

It is a further object of the present invention to provide a remote control for a portable audio device that eliminates redundant control and display elements.

It is a further object of the present invention to provide a remote control for a portable audio device that is highly convenient and functional.

Briefly stated, there is disclosed, a portable audio unit has a main unit, such as a CD player or tape recorder. The main unit is connected to a control unit by a cable. Audio and control signals are transmitted by the cable. The control unit has a connector for an earphone. Audio signals are transmitted by the cable from the main unit, to the control unit and to a connected earphone. Control signals are transmitted from the control unit to the main unit for controlling functions such as volume, power, tape-play, etc. The main unit has a built-in winder that stores and retrieves the cable. The control unit may be attached to the main unit when the cord is wound up and stored. With the control unit attached and the cable stored inside the main unit, the portable audio unit is still operated by the control unit, which forms a built-in control panel. With the cable extended, the control unit may be used as a remote control permitting the main unit to be placed in a handbag or pocket. In a portable audio unit having a separate remote control, a control panel is included in the main unit. The present invention avoids the need for the control panel because the control unit doubles as a control panel. Cost, size and complexity of the portable audio unit are thereby reduced.

According to an embodiment of the present invention, there is disclosed, a portable audio device, comprising: a main unit having means for generating an audio signal, a control unit having control actuators for generating a control signal in response to manipulation by a user, a cable, coupling the control unit and the main unit, having means for transmitting the control signal generated by the control unit to the main unit, the control unit having means for connecting an earphone, the cable having means for transmitting the audio signal to the means for connecting such that the audio signal is transmitted to a connected earphone, the main unit having means for storing and retrieving the cable and the main unit having means for attaching the control unit to the main unit.

According to another embodiment of the present invention, there is disclosed, a portable audio device, comprising: a main unit having means for generating an audio signal, a control unit having control actuators for generating a control signal in response to manipulation by a user, a cable, coupling the control unit and the main unit, having means for transmitting the control signal generated by the control unit to the main unit, the control unit having means for connecting an earphone, the cable having means for transmitting the audio signal to the means for connecting such that the audio signal is transmitted to a connected earphone, means for permitting a partial release of a stored portion of the cable the means for permitting having means for preventing a further release of the stored portion, and the main unit having means for attaching the control unit to the main unit.

According to still another embodiment of the present invention, there is disclosed, a portable audio device, comprising: a main unit having means for generating an audio signal, a control unit having control actuators for generating a control signal in response to manipulation by a user, a cable, coupling the control unit and the main unit, having means for transmitting the control signal generated by the control unit to the main unit, the control unit having means for connecting an earphone, the cable having means for transmitting the audio signal to the means for connecting such that the audio signal is transmitted to a connected earphone, a spool having a ratchet tooth at an end of the spool, means, attached the main unit, for urging the spool to rotate in a first direction, the ratchet tooth having an edge, the spool being rotatably connected to the main unit, a lever, having a pawl shaped to engage an edge of the ratchet tooth, the lever being pivotally attached to the main unit, means, operatively associated with the lever, for urging the pawl against the ratchet tooth such that the pawl engages the ratchet tooth such that a rotation of the spool in the first direction is prevented and means, attached to the main unit, for withdrawing the pawl so as to permit the rotation of the spool.

According to still another embodiment of the present invention, there is disclosed, a portable audio device, comprising: a main unit having means for generating an audio signal, a control unit having control actuators for generating a control signal in response to manipulation by a user, a cable, coupling the control unit and the main unit, having means for transmitting the control signal generated by the control unit to the main unit, the control unit having means for connecting an earphone, the cable having means for transmitting the audio signal to the means for connecting such that the audio signal is transmitted to a connected earphone, means for permitting a partial release of a stored portion of the cable, the means for permitting having means for preventing a further release of the stored portion, a clip attached to the control unit, the housing having a recess, the clip having an edge, a lever, pivotally attached to the main unit, the lever having a claw, shaped for engaging the clip edge, means for urging the claw toward the recess such that the claw engages the edge upon insertion of the control unit in the recess and means for forcing the lever against the means for urging such that the claw disengages from the clip edge thereby releasing the remote control unit.

According to still another embodiment of the present invention, there is disclosed, a portable audio device, comprising: a main unit having means for generating an audio signal, a control unit having control actuators for generating a control signal in response to manipulation by a user, a cable, coupling the control unit and the main unit, having means for transmitting the control signal generated by the control unit to the main unit, the control unit having means for connecting an earphone, the cable having means for transmitting the audio signal to the means for connecting such that the audio signal is transmitted to a connected earphone, the main unit having means for storing and retrieving the cable, the main unit having means for attaching the control unit to the main unit, a display panel on the control unit, the display panel includes a backlight, the main unit includes a main battery, the cable includes means for transmitting power from the main battery to the control unit and the backlight is powered by the main battery.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 2a and 2b are side views of a means remote control unit with a fastening clip according to an embodiment of the portable audio device of FIG. 1.

DETAILED DESCRIPTION OF THE PREFERRED EMBODIMENT

Figure 1:
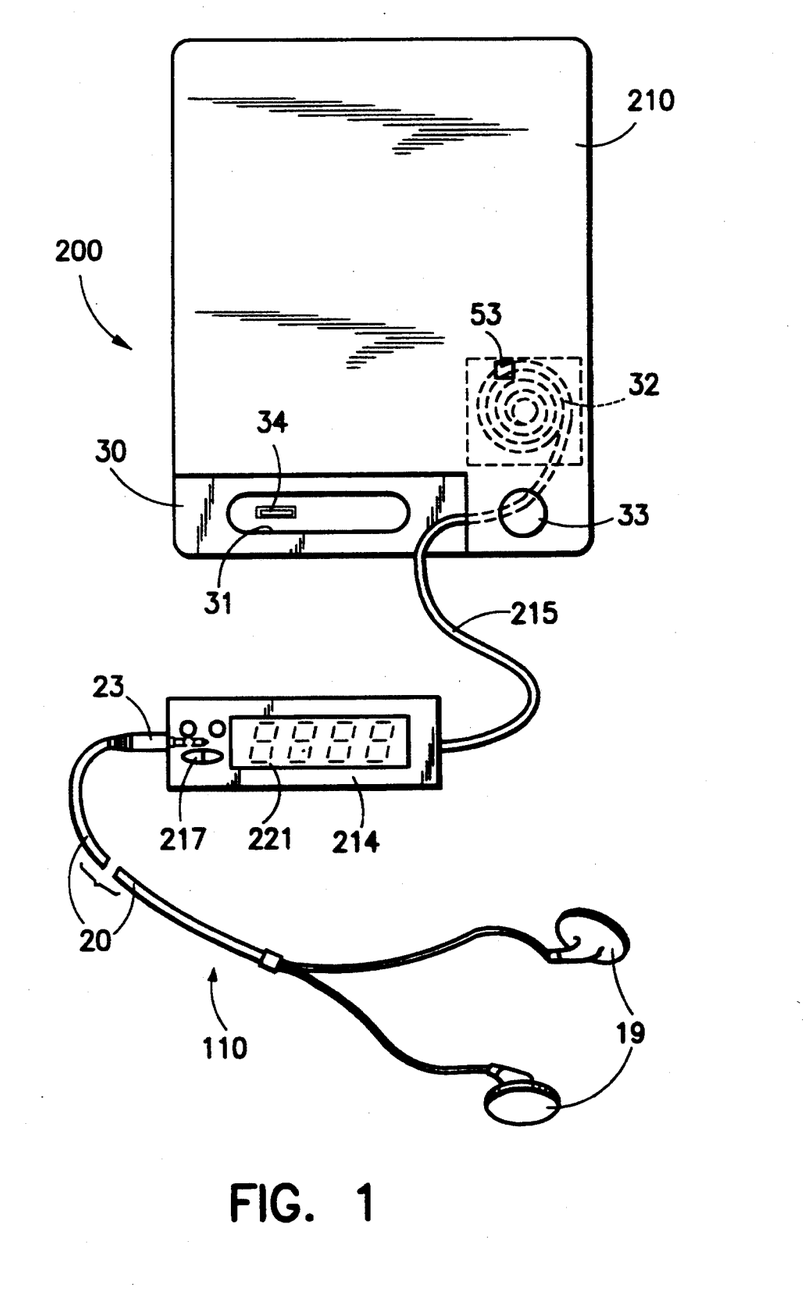
FIG. 1 is a front view of a portable audio device having a remote control unit according to an embodiment of the present invention.

Referring to FIG. 1 a portable audio device, shown generally at 200, such as a CD player or tape recorder, has a main unit 210 containing electrical and mechanical components (not shown) for playing tapes or CDs. A remote control unit 214 controls main unit 210. An audio/control cable 215 feeds control signals from remote control unit 214 to main unit 210. Audio signals from main unit 210 are fed through audio/control cable 215, through remote control unit 214, to an earphone set 110. Earphone set 110 is connectable to, and disconnectable from, remote control unit 214 by a first plug 23.

A cord-winder 32 inside main unit 210 reels in and stores audio/control cable 215. A cradle 30 is built into main unit 210 at a corner of housing 210A. Remote control unit 214 fits into cradle 30. Dimensions of cradle 30 are identical to dimensions of remote control unit 214. Therefore, when remote control unit 214 is placed in cradle 30, surfaces of remote control unit 214 and of housing 210A of main unit 210 are contiguous, presenting a uniform outer surface.

Figure 2A:
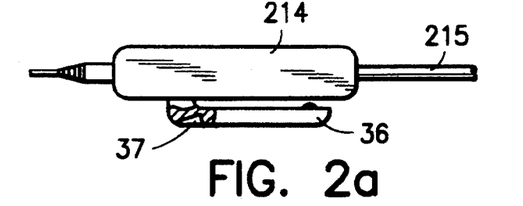
Figure 2B:
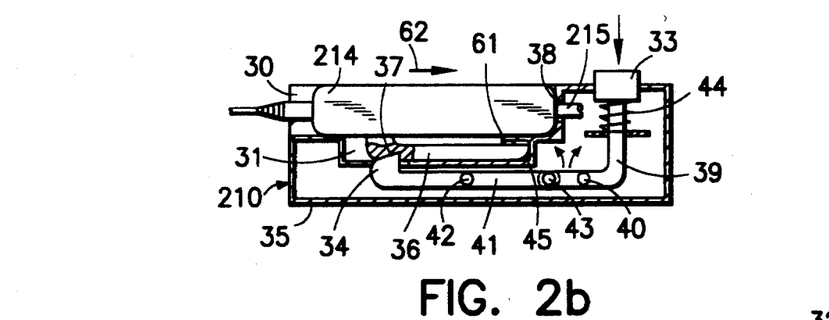
FIG. 2b is a side view of the remote control and fastening clip of FIG. 2a shown mounted in a main unit, the main unit being shown in cross-section

Referring now to FIGS. 2a, and 2b to fasten remote control unit 214, a clip 36 on remote control unit 214 is inserted into an engagement recess 31 in cradle 30. Then remote control unit 214 is pushed in a direction shown by an arrow 62 to engage clip 36 with an engagement tab 61. A stop claw 34, urged into engagement recess 31 by a spring 44, engages a clip recess 37 in clip 36. Stop claw 34 prevents clip 36 from disengaging with engagement tab 61, securing remote control unit 214 to main unit 210.

Stop claw 34 is retracted by a release button 33 which protrudes slightly from main unit 210. Release button 33 is attached to a first end of an L-shaped first lever 39. First lever 39 pivots on first support pin 40. A second end of first lever 39 is pivotably connected to a first end of a second lever 41. Second lever 41 pivots on a second support pin 42. Stop claw 34 is integral with a second end of second lever 41.

Spring 44 urges release button 33 to extend beyond housing 210A outwardly causing release button 33 to protrude from main unit 210. A force applied by spring 44 causes first lever 39 to pivot counterclockwise and second lever 41 to pivot clockwise. Thus, stop claw 34 is urged into engagement recess 31 by spring 44. Pressing release button 33 pivots first lever 39 clockwise. Pivoting first lever 39 pivots second lever 41 counterclockwise. Pivoting of second lever 41 counter-clockwise withdraws stop claw 34 from clip recess 37. Withdrawing stop claw 34 from clip recess 37 allows clip 36 to be withdrawn from engagement tab 61. Then clip 36 can be removed from engagement recess 31. Then remote control unit 214 to be removed from cradle 30.

Figure 3:
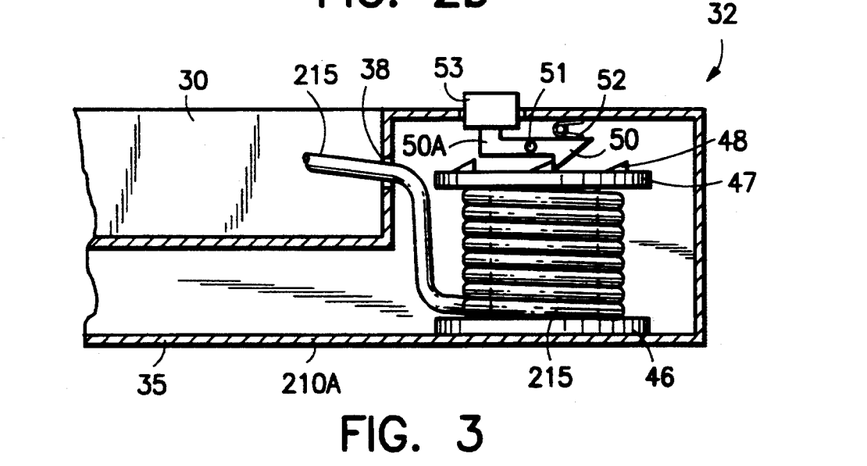
FIG. 3 is a section view of a cord winder according to a first embodiment of the portable audio device of FIG. 1.
Figure 4:
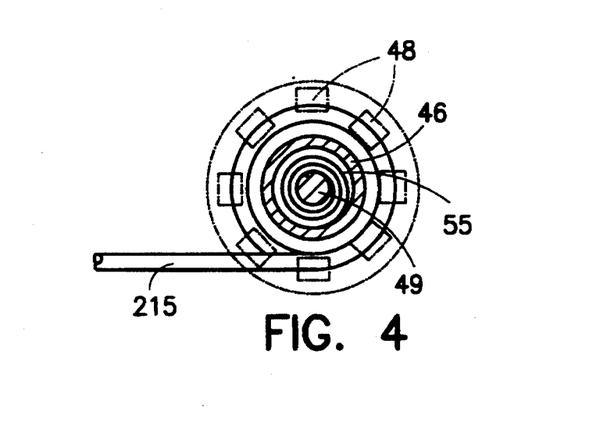
FIG. 4 is a cross-sectional view of a spool element of the cord winder of FIG. 3.

Referring now to FIGS. 3 and 4, a cord winder 32 inside housing 210A includes a spool 46. Spool 46 rotates about a shaft 49. A spiral spring 55 engages spool 46, urging it to rotate in a first direction. A circular arrangement of ratchet teeth 48 protrude from a flange 47 at one end of spool 46. A pawl 50 at one end of a pawl lever 50A is shaped to engage ratchet teeth 48. Pawl lever 50A pivots on pawl lever support pin 51. A wind button 53 at another end of pawl lever 50A extends through housing 210A. Pawl 50 is urged between ratchet teeth 48 by a pawl spring 52.

Ratchet teeth 48 and pawl 50 have bevel shapes and are arranged so that ratchet teeth 48 push pawl 50 away from ratchet teeth 48 when spool 46 rotates in a second direction opposite that of the first direction. Thus, ratchet teeth 48 and pawl 50 engage only when spool 46 rotates in the first direction. Engagement of pawl 50 and ratchet teeth 48 prevents spool 46 from spinning freely under the urging of spiral spring 55.

Audio/control cable 215 enters housing 210A through a port 38 in cradle 30 and attaches to spool 46. When wind button 53 is pressed, pawl 50 disengages from ratchet teeth 48 and releases spool 46. When spool 46 is released, audio/control cable 215 winds around spool 46, causing spiral spring 55 to unwind. When audio/control cable 215 is pulled, spool 46 rotates in the second direction, rewinding spiral spring 55.

To use remote control unit 214, the user removes remote control unit 214 from cradle 30 and pulls audio/control cable 215. This unwinds audio/control cable 215 from spool 46. Engagement of pawl 50 and ratchet teeth 48 prevent audio/control cable 215 from winding back onto spool 46. With audio/control cable 215 extended, main unit 210 may be placed in a pocket or handbag. Remote control unit 214 may be attached to an article of clothing (not shown) or a handbag (not shown) by slipping clip 36 over a conveniently accessible edge of the clothing or handbag. Remote control unit 214 may then be used by the user to control main unit 210.

When the user is finished using remote control unit 214 detached from main unit 210, the user presses wind button 53. This releases spool 46. Tension in spiral spring 55, previously generated by unwinding audio/control cable 215 from spool 46, causes spool 46 to rotate. Audio/control cable 215 is wound around spool 46 and drawn into housing 210A. Preferably, a guide (not shown) insures that audio/control cable 215 is wrapped evenly around spool 46. Remote control unit 214 is then placed in cradle 30 so that clip 36 fits into engagement recess 31. Remote control unit 214 is then pushed in the direction of arrow 62 to engage clip 36 under engagement tab 61. Stop claw 34 is pushed into clip recess 37 by spring 44 preventing it from falling out of cradle 30. Remote control unit 214 is thus securely held in place in cradle 30. When in this position, the user may still use remote control unit 214 to control main unit 210. For example, main unit 210 may be used on a table and operated with remote control unit 214 as a built-in control panel of main unit 210.

When the user intends to use remote control unit 214 remotely again, he presses release button 33. This causes stop claw 34 to withdraw from clip recess 37. Remote control unit 214 may then be pulled away from main unit 210. Audio/control cable 215 then unwinds from spool 46. As spool 46 unwinds, ratchet teeth 48 push pawl 50 away ratchet teeth 48 permitting spool 46 to rotate freely. When a desired length of audio/control cable 215 is pulled out, the user stops pulling. Then spool 46 rewinds slightly under the urging of spiral spring 55 until one of ratchet teeth 48 engages pawl 50.

Figure 5:
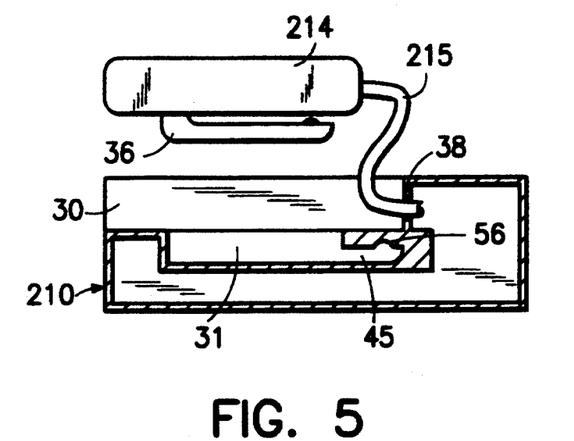
FIG. 5 is a section view of a fastening means for the remote control according to another embodiment of the portable audio device of FIG. 1.

Referring, now, to FIGS. 2a, 2b and 5, the above description relates to an embodiment in which a release button 33 and stop claw 34 hold remote control unit 214. The invention is not limited to this embodiment. For example, in another embodiment, a hollow 56 inside an insertion hole 45 in engagement recess 31 engages a protrusion on clip 36 to prevent detachment. To attach remote control unit 214 to main unit 10, clip 36 is pushed into insertion hole 45. Pressure exerted by clip 36 forces the protrusion on clip 36 into hollow 56, preventing clip 36 from moving out of engagement with insertion hole 45 unless deliberate force is applied by the user.

Figure 6:
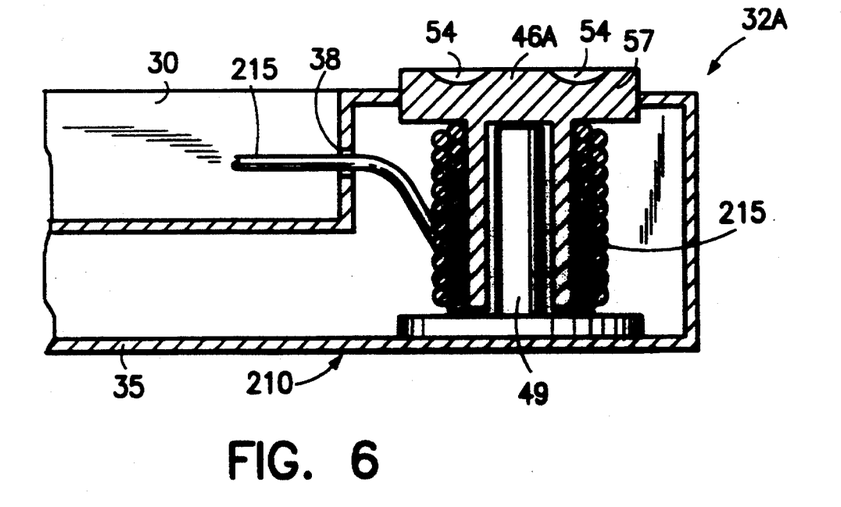
FIG. 6 is a section view of a cord winder according to still another embodiment of the portable audio device of FIG. 1.

Referring, now to FIG. 6, in the previously described embodiment, cord winder 32 is wound by the force of winding spiral spring 55. In another embodiment having a different cord winder 32A, a spool 46A rotates on a shaft 49A. A knob 57 is partially exposed through a top surface of main unit 210. The exposed portion of knob 57 has one or a plurality of finger recesses 54. The user can wind audio/control cable 215 by manually turning knob 57 using finger recesses 54 in knob 57.

Referring to FIGS. 1 and 7, the purpose of this invention is to eliminate the redundancy inherent in the portable audio device 100. To this end, in the present invention, remote control unit 214, serves the purpose of main control panel 22 of the prior art main unit 10 as well as the purpose of remote control unit 14a. Among the advantages achieved are lower cost and portability.

Referring now also to FIGS. 2a-6, operation of the invention is as follows. The user presses wind button 53 allowing spool 46 to rotate under the urging of spiral spring 55. Audio/control cable 215 is thereby wound onto spool 46. Alternatively, in cord winder 32A, spool 46A is rotated manually using finger recesses 54 in knob 57 winding audio/control cable 215 onto spool 46A. As audio/control cable 215 is taken up by spool 46, the user maintains pressure on wind button 53. Remote control unit 214 is inserted in cradle 30. Then wind button 53 is released. Clip 36 is fitted into engagement recess 31. Stop claw 34 is pushed into clip recess 37 by the force of spring 44. Clip recess 37 engages stop claw 34, and remote control unit 214 is held in place. Main unit 210 may be used with remote control unit 214 in cradle 30.

When portable audio device 200 is to be used with remote control unit 214 removed, release button 33 is pressed by the user. Pressing release button 33 withdraws stop claw 34. Remote control unit 214 may then be slipped out of cradle 30. Audio/control cable 215 is then drawn out through port 38, rotating spool 46. The beveled shape of ratchet teeth 48 and pawl 50 insures that pawl 50 is pushed away from spool 46 as it rotates.

When remote control unit 214 is used in this way, the user clips clip 36 to the user's clothing or handbag or on some other convenient object. The user inserts earphones 19 into his ears. The user then inserts first plug 23 into remote control unit 214. User operates main unit 210 using remote control actuators 217 on remote control unit 214.

Advantages of the invention are as follows. Operation of main control actuators 12 of main control panel 22 of main unit 10, performs functions such as power on and off, sound volume, stopping, rewinding, fast-forwarding, etc. Operation of remote control actuators 17a or 17b of remote control unit 14a or 14b can perform the same functions. Thus, remote control unit 14a or 14b and main control panel 22 can be combined into one device. The result of such a combination is a diminution of wasteful duplication compared to the prior art portable audio device 100.

Only one remote display 221 is required in portable audio device 200. Remote display 21 of the prior art portable audio device 10 represents an expensive component and is large in size. The high cost and extra size of duplicating such a unit can be avoided by use of the present invention. In addition, the risk of breakdown can be reduced because of the smaller number of components. Furthermore, the overall size and weight of the portable audio device 100 may be reduced.

Another advantage of the present invention, is that the length of Audio/control cable 215 can be controlled by the user in accordance with his desires and the purpose of use. For example, when main unit 10 is put into a pocket or handbag, the length of Audio/control cable 215 can be adjusted appropriately. Since audio/control cable 215 can be pulled out only as far as is needed, it does not get in the way.

In addition, since remote control panel 214 is permanently connected to main unit 210, no separate battery 18 is needed for remote display 221. Main unit 210 carries a large battery to power the audio components. Because the large main unit battery is available to power remote control unit 214, a backlight may be included in remote display 221. Such a backlight would exhaust small battery 18 very quickly. Another result of the permanence of the connection between remote control unit 214 and main unit 210 is that the need for a second plug 16 as required by the prior art portable audio device 100 is avoided.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A portable audio device, comprising:
   a main unit including means for generating an audio signal;
   said main unit including a control unit having control actuators for generating a control signal in response to manipulation by a user;
   said control unit control actuators being a sole means by which primary functions of main unit are controlled;
   a cable, coupling said control unit and said main unit, including means for transmitting said control signal generated by said control unit to said main unit;
   said control unit including means for connecting an earphone;
   said cable including means for transmitting said audio signal to said means for connecting such that said audio signal is transmitted to a connected earphone;
   said main unit including means for storing and retrieving said cable; and
   said main unit including means for fixedly attaching said control unit to said main unit in a position on said main unit effective to provide ready access to said actuators by said user when said control unit is fixedly attached to said main unit.

2. A portable audio device as recited in claim 1, wherein:
   said main unit has a housing;
   said means for storing and retrieving includes means for storing said cable inside said housing;
   said means for storing and retrieving includes means for drawing said cable into said housing.

3. A portable audio device as recited in claim 2, wherein said means for storing and retrieving includes:
   means permitting a partial release of a stored portion of said cable; and
   said means for permitting having means for preventing a further release of said stored portion.

4. A portable audio device as recited in claim 1, wherein said means for storing and retrieving includes:
   means permitting a partial release of a stored portion of said cable; and
   said means for permitting having means for preventing a further release of said stored portion.

5. A portable audio device as recited in claim 4, wherein said means for storing and retrieving includes:
   a spool, rotatably connected to said main unit;
   said cable being connected to said spool;
   said cable winding around said spool during a retrieval of said cable; and
   means for rotating said spool.

6. A portable audio device as recited in claim 5, wherein said means for rotating includes a knob attached to said spool;
   said knob extending beyond a surface of a housing of said main unit; and said knob having means for manually gripping said knob.

7. A portable audio device as recited in claim 4, wherein said means for storing and retrieving includes:
   a spool having a ratchet tooth at an end of said spool;
   means, attached said main unit, for urging said spool to rotate in a first direction;
   said ratchet tooth having an edge;
   said spool being rotatably connected to said main unit;
   a lever, having a pawl shaped to engage an edge of said ratchet tooth;
   said lever being pivotally attached to said main unit;
   means, operatively associated with said lever, for urging said pawl against said ratchet tooth such that said pawl engages said ratchet tooth preventing a rotation of said spool in said first direction; and means, attached to said main unit, for withdrawing said pawl so as to permit said rotation of said spool.

8. A portable audio device as recited in claim 7, wherein said means for attaching includes:
a clip attached to said control unit;
said housing having a recess;
said control unit being insertable into said recess; and
one of a protrusion and a tab, attached to said main unit, shaped for engaging said clip upon insertion of said control unit in said recess.

9. A portable audio device as recited in claim 4, wherein said means for attaching includes:
a clip attached to said control unit;
said housing having a recess;
said clip having an edge;
a lever, pivotally attached to said main unit;
said lever having a claw, shaped for engaging said clip edge;
means for urging said claw toward said recess such that said claw engages said edge upon insertion of said control unit in said recess; and
means for forcing said lever against said means for urging such that said claw disengages from said clip edge thereby releasing said remote control unit.

10. A portable audio device as recited in claim 4, wherein:
said control unit includes a display panel;
said display panel includes a backlight;
said main unit includes a main battery;
said cable includes means for transmitting power from said main battery to said control unit; and
said backlight is powered by said main battery.

11. A portable audio device as recited in claim 1, wherein said means for attaching includes:
a clip attached to said control unit;
said housing having a recess;
said control unit being insertable into said recess; and
one of a protrusion and a tab, attached to said main unit, shaped for engaging said clip upon insertion of said control unit in said recess.

12. A portable audio device as recited in claim 1, wherein said means for attaching includes:
a clip attached to said control unit;
said housing having a recess;
said clip having an edge;
a lever, pivotally attached to said main unit;
said lever having a claw, shaped for engaging said clip edge;
means for urging said claw toward said recess such that said claw engages said edge upon insertion of said control unit in said recess; and
means for forcing said lever against said means for urging such that said claw disengages from said clip edge thereby releasing said remote control unit.

13. A portable audio device as recited in claim 12, wherein:
said control unit includes a display panel;
said display panel includes a backlight;
said main unit includes a main battery;
said cable includes means for transmitting power from said main battery to said control unit; and
said backlight is powered by said main battery.

14. A portable audio device as recited in claim 13, wherein said means for storing and retrieving includes:

a spool having a ratchet tooth at an end of said spool;
means, attached said main unit, for urging said spool to rotate in a first direction;
said ratchet tooth having an edge;
said spool being rotatably connected to said main unit;
a lever, having a pawl shaped to engage an edge of said ratchet tooth;
said lever being pivotally attached to said main unit;
means, operatively associated with said lever, for urging said pawl against said ratchet tooth such that said pawl engages said ratchet tooth such that a rotation of said spool in said first direction is prevented; and
means, attached to said main unit, for withdrawing said pawl so as to permit said rotation of said spool.

15. A portable audio device as recited in claim 1, wherein:
said control unit includes a display panel;
said display panel includes a backlight;
said main unit includes a main battery;
said cable includes means for transmitting power from said main battery to said control unit; and
said backlight is powered by said main battery.

16. A portable audio device comprising:
a main unit including means for generating an audio signal;
said main unit including a control unit;
said control unit including means for generating control signals responsive to manipulation by a user;
said control unit including means for connecting an earphone;
a cable, coupling said control unit and said main unit, including means for transmitting signals therebetween;
means for storing said cable;
means for attaching and detaching said control unit from said main unit for remote use;
said means for storing including means for retracting and extending said cable responsive to said means for attaching and detaching, respectively;
said main unit including means for supporting said control unit when attached to said main unit; and
said means for supporting being effective to provide said user manual access to said means for generating.

17. A portable audio player according to claim 16, wherein said means for generating provides a sole means for controlling certain primary functions of said main unit.

18. A portable audio player according to claim 16, wherein at least one of said means for generating control signals of said control unit is not duplicated in another means for generating control signals.

19. A portable audio device comprising:
a main unit including means for generating audio signals and having a housing;
a control unit having first and second operating positions;
said control unit including means for connecting an earphone;
a cable, coupling said control unit with said main unit, for transmitting signals therebetween;
said first operating position having said control unit attached fixedly with said housing;
said second operating position having said control unit detached from said housing; and said housing including means for retracting and extending said cable responsive to said first and second operating positions, respectively.

20. A portable audio player according to claim 19, wherein at least one of the means for generating control signals of said control unit are unique to said control unit.

21. A portable audio player comprising:
a main unit including means for generating audio signals;
said main unit including a single control unit;
at least a portion of said control unit including means for physically detaching said control unit from said main unit;
said at least a portion of said control unit including means for connecting an earphone;
a cable, coupling said at least a portion of said control unit and said main unit, including means for transmitting signals therebetween;
means for storing said cable;
means for attaching and detaching said at least a portion of said control unit from said main unit for remote use through said cable; and
said means for storing including means for retracting and extending said cable responsive to said means for attaching and detaching, respectively.

22. A portable audio player according to claim 21, wherein at least one of the means for generating control signals of said control unit are unique to said control unit.

23. A portable audio player according to claim 21, wherein said means for generating provides a sole means for controlling certain primary functions of said main unit.

* * * * *